(12) United States Patent
Moore

(10) Patent No.: US 7,457,740 B2
(45) Date of Patent: Nov. 25, 2008

(54) METHOD AND SYSTEM FOR ESTIMATING THE SIGNIFICANCE OF RARE EVENTS

(75) Inventor: Robert C. Moore, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 740 days.

(21) Appl. No.: 10/892,065

(22) Filed: Jul. 15, 2004

(65) Prior Publication Data

US 2006/0015325 A1 Jan. 19, 2006

(51) Int. Cl.
*G06F 17/27* (2006.01)
(52) U.S. Cl. .............................. 704/9; 704/2; 704/277; 704/5
(58) Field of Classification Search ................ 704/1, 704/2, 5, 7, 8, 9, 10, 277, 257
See application file for complete search history.

(56) References Cited

U.S. PATENT DOCUMENTS 5,991,710 A * 11/1999 Papineni et al. ............... 704/2

OTHER PUBLICATIONS

Ted Dunning. 1993. Accurate methods for the statistics of surprise and coincidence. Computational Linguistics, 19(1):61-74.
Diana Z. Inkpen et al., 2002. Acquiring collocations for lexical choice between near-synonmys. 2002. In Unsupervised Lexical Acquisition Proceedings of the Workshop of the ACL Special Interest Group on the Lexicon (SIGLEX), pp. 67-76, Penn.
Rada Mihalcea et al. 2003. An evaluation exercise for word alignment. In Proceedings of the HLT-NAACL2003 Workshop, Building and Using Parallel Texts: Data Driven Machine Translation and Beyond, pp. 1-6, Edmonton, Alberta.
Ted Pederson et al., 1996. significant Lexical Relationships. In Proceedings of the 13th National Conference of Artificial Intelligence, Portland, Oregon.

* cited by examiner

*Primary Examiner*—Huyen X. Vo
(74) *Attorney, Agent, or Firm*—Westman, Champlin & Kelly, P.A.

(57) ABSTRACT

The present invention can be used to calculate expected precision for association values between types of items in one class with types of items in another class. The present invention accommodates rare events.

40 Claims, 5 Drawing Sheets

METHOD AND SYSTEM FOR ESTIMATING THE SIGNIFICANCE OF RARE EVENTS

BACKGROUND OF THE INVENTION

The present invention relates to analysis of rare events. More specifically, the present invention relates to determining the significance of rare events that occur in, for example, natural language processing systems, such as in the machine translation context, or in any other system that encounters rare events.

There are a wide variety of natural language processing systems which use statistical processing. One such system is a machine translation system. A machine translation system receives a textual input in one language, translates it to a second language, and provides a textual output in the second language. Such systems often use statistical methods to measure the strength of association, particularly lexical associations.

One conventional measure used in natural language processing is referred to as the $G^2$ log-likelihood-ratio statistic. This measure is discussed in greater detail in Dunning, ACCURATE METHODS FOR THE STATISTICS OF SURPRISE AND COINCIDENCE, Computational Linguistics, 19(1):61-74 (1993). Even though this statistic is widely used in natural language processing, its use remains controversial on the grounds that it may be unreliable when applied to rare events.

Another statistic conventionally used in natural language processing is referred to as the Chi-square statistic. This is described in greater detail in Adgresti et al., CATEGORICAL DATA ANALYSIS, John Whiley and Sons, New York, N.Y. (1990). It has been demonstrated that the Chi-square test is valid with smaller sample sizes and more sparse data than the $G^2$ statistic. However, either Chi-square or $G^2$ can be unreliable when expected frequencies of less than five are involved.

A phenomenon referred to as Zipf's Law shows that the problem of rare events invariably arises whenever dealing with individual words. Zipf's Law has various formulations, but they all imply that relatively few words in a language are very common, and most words are relatively rare. This means that no matter how large a corpus is, most of the distinct words in that corpus occur only a small number of times. For example, one corpus includes 500,000 English sentences sampled from the Canadian Hansards data supplied for the bilingual word alignment workshop held at HLT-NAACL 2003 (and referred to in more detail in Mihalcea and Pedersen, AN EVALUATION EXERCISE FOR WORD ALIGNMENT, Proceedings of the HLT-NAACL 2003 workshop, BUILDING AND USING PARALLEL TEXTS: DATA DRIVEN MACHINE TRANSLATION AND BEYOND, pp. 1-6, Edmonton Alberta (2003)). In that corpus, there are 52,921 distinct word types, of which 60.5 percent occur five or fewer times, and 32.8 percent occur only once.

While the $G^2$ statistic has been most often used in natural language processing as a measure of the strength of association between pairs of words, the sparse data problem which renders the $G^2$ statistic unreliable becomes even worse when considering pairs of words. For example, considering the 500,000 French sentences corresponding to the English sentences described above, it can be seen that 19,460,068 English-French word pairs occur in aligned sentences more often than would be expected by chance, given their monolingual frequencies. Of these, 87.9 percent occur together five or fewer times (i.e., they have a joint occurrence frequency of five or less) and 62.4 percent occur together only once.

Moreover, if the expected number of occurrences of these word pairs (which is the criteria used for determining the applicability of Chi-square or $G^2$ significance tests) is considered, it can be seen that 93.2 percent would be expected by chance to have fewer than five occurrences. Thus, any statistical measure that is unreliable for expected frequencies of less than five would be wholly unusable with such data.

In the past, a wide variety of statistics have been used to measure the strength of word association. Such statistics include point-wise mutual information, the Dice coefficient, Chi-square, $G^2$ and Fisher's Exact Test. Each of these is described in greater detail in Inkpen, Hirst, ACQUIRING COLLOCATIONS FOR LEXICAL CHOICE BETWEEN NEAR-SYNONYMS, UNSUPERVISED LEXICAL ACQUISITION: Proceedings of the Workshop of the ACL Special Interest Group on the Lexicon (SIGLEX), pp. 67-76, Philadelphia, Pa. (2002).

Despite the fact that many of these statistics arise from significance testing, the conventional practice in applying them in natural language processing has been to choose a threshold heuristically for the value of the statistic being used and to discard all the pairs below the threshold. It has been conventionally taught that there is no principled way of choosing these thresholds. See Inkpen and Hirst p. 70. Indeed, if standard statistical tests are conventionally used, the results make no sense in the types of natural language processing systems discussed herein.

An example may be helpful in illustrating the deficiencies of the conventional systems. Consider the case of two words that each occur only once in a corpus, but happen to co-occur. Conventional wisdom strongly advises suspicion of any event that occurs only once, yet it is easy to see that applying standard statistical methods to this case tend to suggest that it is highly significant, without using any questionable approximations at all.

The question that significance tests for association (such as Chi-square, $G^2$ and Fisher's Exact Test) are designed to answer is: Given the sample size and the marginal frequencies of the two items in questions, what is the probability (or p-value) of seeing by chance as many or more joint occurrences as were observed? In the case of a joint occurrence of two words that each occur only once, this is trivial to calculate.

For instance, suppose an English word and a French word each occur only once in the corpus discussed above of 500,000 aligned sentence pairs of Hansards data, but they happen to occur together. In order to determine the probability that this joint occurrence happened by chance, it can be supposed that the English word occurs in an arbitrary sentence pair. The probability that the French word, purely by chance, would occur in the same sentence pair is clearly 1 in 500,000 or 0.000002. Since it is impossible to have more than one joint occurrence of two words that each have only a single occurrence, 0.000002 is the exact p-value for the question we have asked. However, one should not assume that the association between the words is highly certain on this basis alone, but this is what was done in conventional approaches.

SUMMARY OF THE INVENTION

The present invention can be used to calculate expected precision of association values for large numbers of rare events such as those described above.

In one embodiment, the precision is estimated for each of a plurality of thresholds. The marginal frequencies of the items that occur in the data sample are first computed. Also, the number of distinct items for each marginal frequency is also computed. A set of association score thresholds is chosen for which to calculate expected precision. The expected pair counts for each threshold are accumulated by iterating through all possible combinations of observed marginals. The number of item pairs observed to have an association score equal to or greater than each threshold in the set is computed. The expected noise and precision are calculated for each threshold and a desired threshold can then be selected for later natural processing steps.

Optionally, recall can be determined as well. In that case, the desired threshold can be chosen based on conventional means for choosing a value given the tradeoff between precision and recall.

DETAILED DESCRIPTION OF ILLUSTRATIVE EMBODIMENTS

The present invention deals with determining the significance of rare events in assigning associations. The present invention is described in the context of a machine translation learning system for the sake of example only and can be applied to other natural language processing systems or other different systems as well. Before describing the present invention in greater detail, one illustrative environment in which the present invention can be used is discussed.

Figure 1:
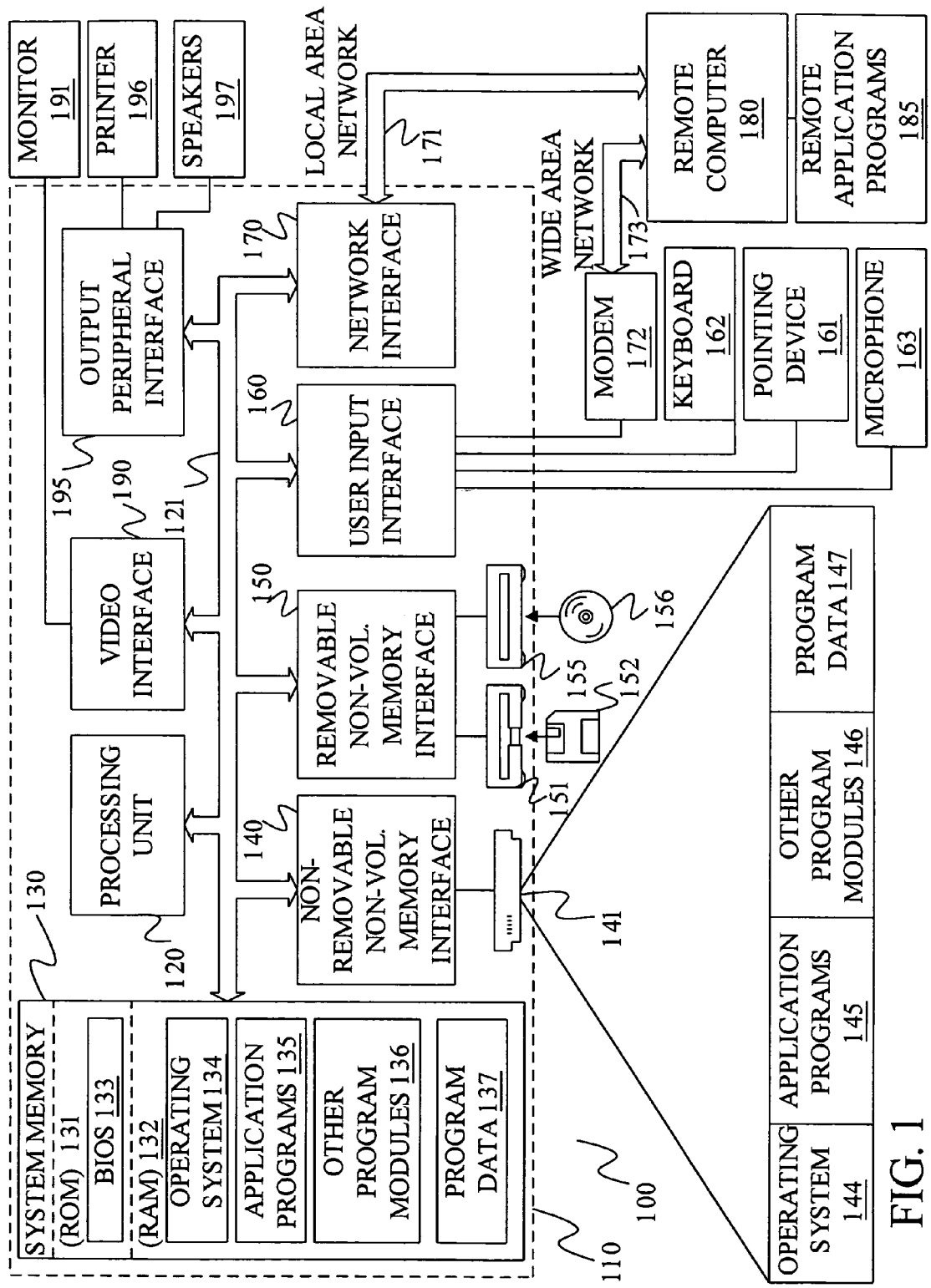
FIG. 1 is a block diagram of one illustrative environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
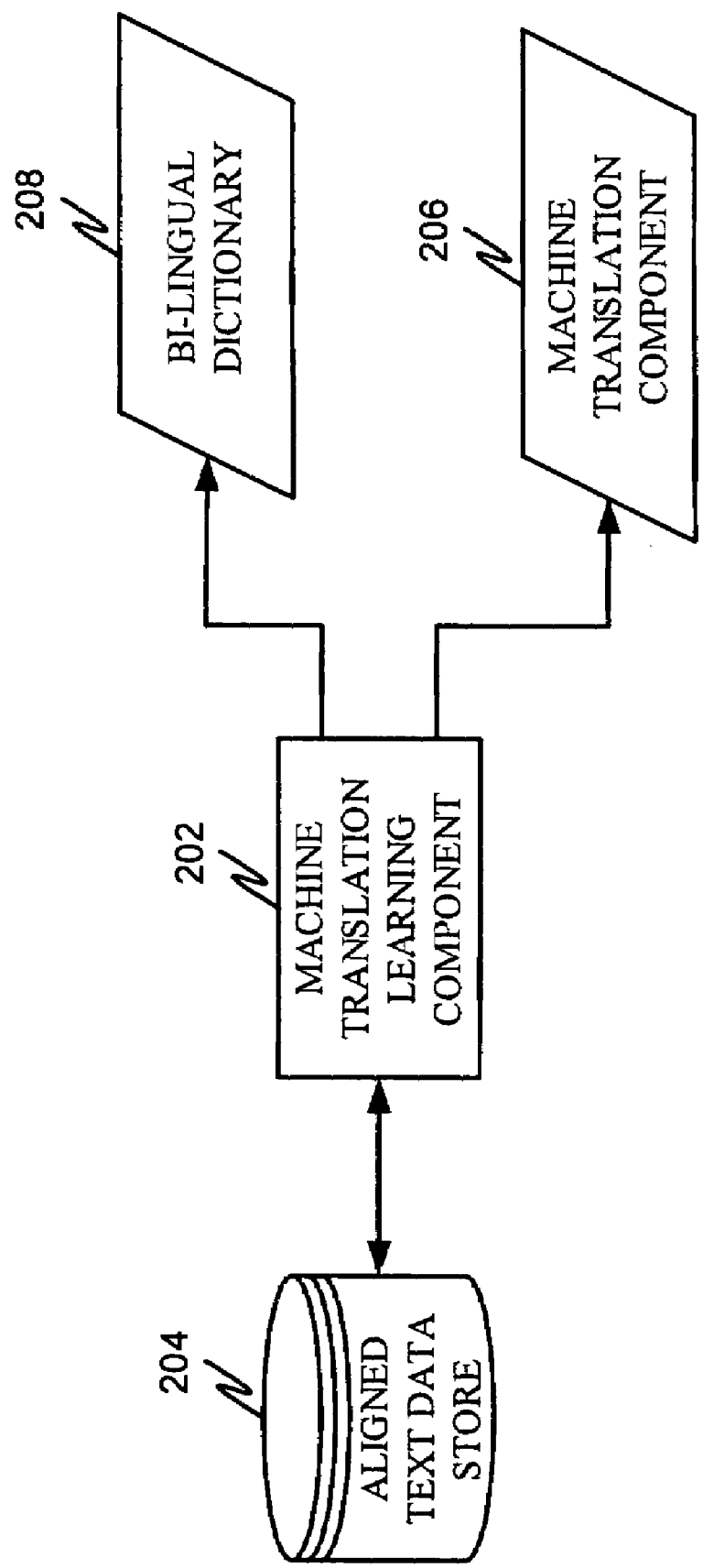
FIG. 2 is a block diagram of a machine translation learning component.

While the present invention is useful in numerous different natural language processing systems, it will be described for illustrative purposes only with respect to a machine translation learning system. FIG. 2 illustrates a block diagram of one such machine translation learning system 200. System 200 includes a machine translation learning component 202 that has access to an aligned text data store 204. Aligned text data store 204 illustratively includes a corpus of aligned bilingual data. Machine translation learning component 202 accesses the aligned data and illustratively learns word and phrase translation relationships and generates or trains a machine translator component 206 that uses the relationships based on associations and association thresholds described herein. Learning component 202 can also illustratively generate a bilingual dictionary 208, or other components used in machine translation. In use, machine translator component 206 receives a textual input in a first language, translates the textual input into a second language and provides the translated output.

As described in the background section, prior conventional techniques have tended to drastically over-estimate the significance of association scores for rare events. To illustrate this more clearly, the present discussion proceeds with reference to the example discussed in the background section.

Continuing on with that example, it is clear that even though the p-value of the joint occurrence of the two singleton words is 0.000002, one cannot assume that the association of the two words is 0.999998 certain on this basis alone. The problem is that there are so many possible singleton-singleton pairs, that it is very likely that some of them will occur jointly, purely by chance. This too is easy to calculate. In the 500,000 sentence pairs, assume that there are 17,379 English singletons (words that occur only once in the corpus) and 22,512 French singletons. Therefore, there are 391,236,048 possible singleton-singleton pairs. For each pair, the probability of having a joint occurrence by chance is 0.000002, so the expected number of chance joint occurrences of singleton-singleton pairs is 391,235,048×0.000002, or approximately 782.5.

The question of whether a singleton-singleton pair is significant thus turns on how many singleton-singleton pairs we observe. If we see only approximately 800 such pairs, then they are likely not significant, because that is approximately the number one would expect to see by chance.

In the corpus discussed above, however, 19,312 singleton-singleton pairs exist. Thus, an estimate of the proportion of the singleton-singleton pairs that are due to chance is 782.5/19312=0.0405, which is referred to herein as the "expected noise" in the singleton-singleton pairs. Viewed another way, it is estimated that at least 95.9 percent of the observed singleton-singleton pairs are not due to chance which can be referred to as the "expected precision." A binomial distribution can be used to calculate that there is a 0.99 probability that there are no more than 848 singleton-singleton pairs by chance, and hence that there is 0.99 probability that at least 95.6 percent of the observed singleton-singleton pairs are not due to chance.

The above discussion shows that the p-value for the observed joint frequency given the marginal frequencies and sample size is used in an indirect way as the base statistical measure. It can thus be applied to any other measure of association. For instance, for a joint occurrence of two singletons in 500,000 samples, $G^2$ is approximately 28.24. Therefore, to use $G^2$ as the measure of association, the present invention compares the number of word pairs expected by chance to have a $G^2$ score greater than or equal to 28.24 with the number of word pairs observed to have a $G^2$ score greater than or equal to 28.24, and computes the expected noise and precision just as discussed above with the p-values. The same can be done for any measure of association.

This means that, optionally, two different statistics can be used to estimate expected noise and precision, one as a measure of association and one to estimate the number of word pairs expected by chance to have a given level or higher of the association measure. In one illustrative embodiment, a log-likelihood-ratio based measure is used as the measure of association, and the Fisher's Exact Test is used to estimate expectations. Of course, the log-likelihood-ratio based tests could be used to estimate expectations as well.

In performing the method of the present invention, a number of issues must be considered. Computing the expected number of pairs with the given association score or higher for a large collection of word pairs having a wide range of marginal frequencies can be difficult. The p-value for an association score must first be computed and then multiplied by an appropriate number of word pairs. However, if the association score itself does not correlate exactly with the p-value, the relationship between association score and p-value will vary with each combination of marginal frequencies. Furthermore, even for a single combination of marginal frequencies, there is in general no way to translate directly from an association score to the corresponding p-value. Further, until all the expected frequencies and observed frequencies of interest have been computed, it is not known which association score will correspond to a desired level of expected precision.

Figure 3:
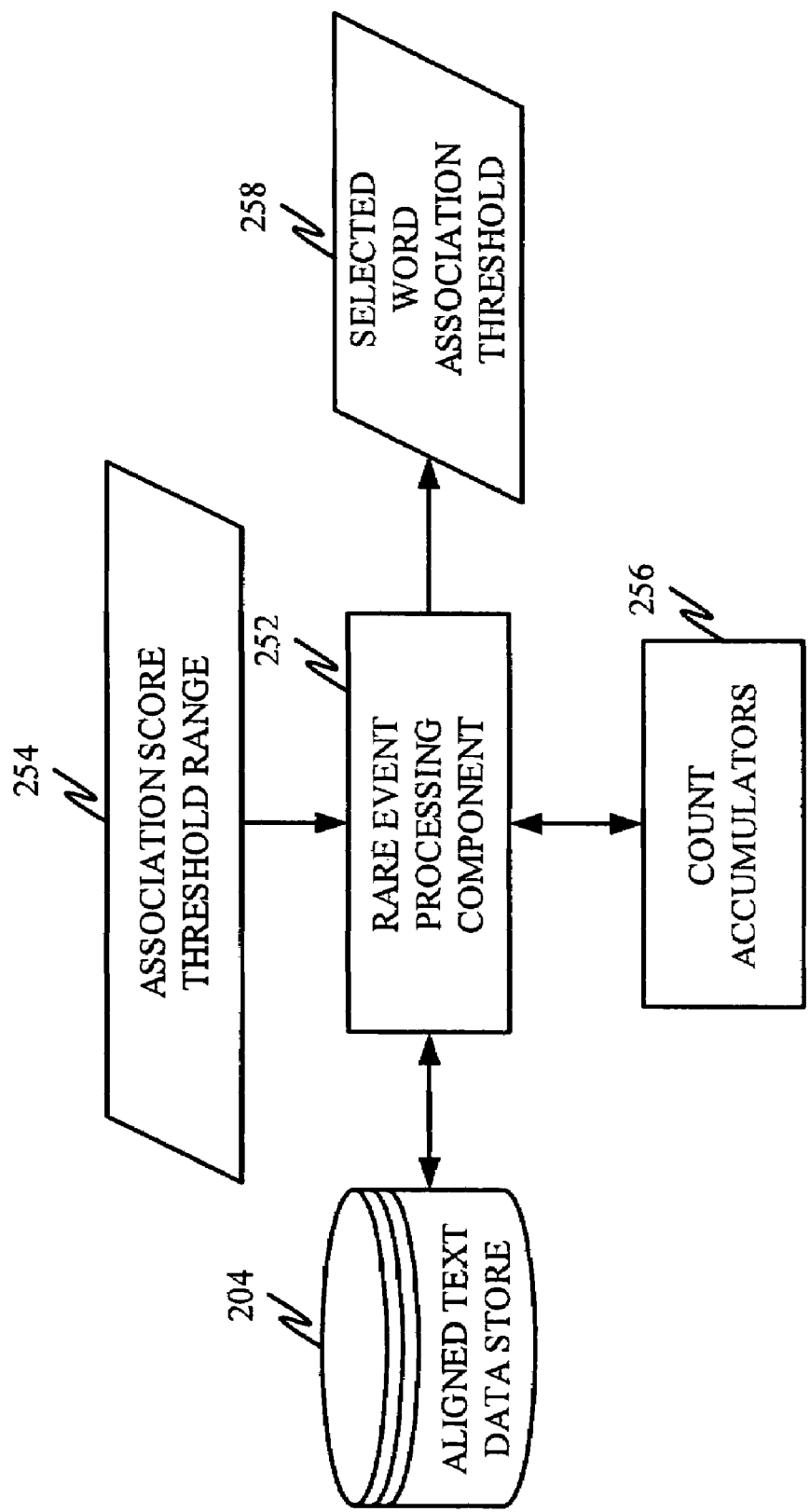
FIG. 3 is a more detailed block diagram of a rare event processing system in accordance with one embodiment of the present invention.
Figure 4:
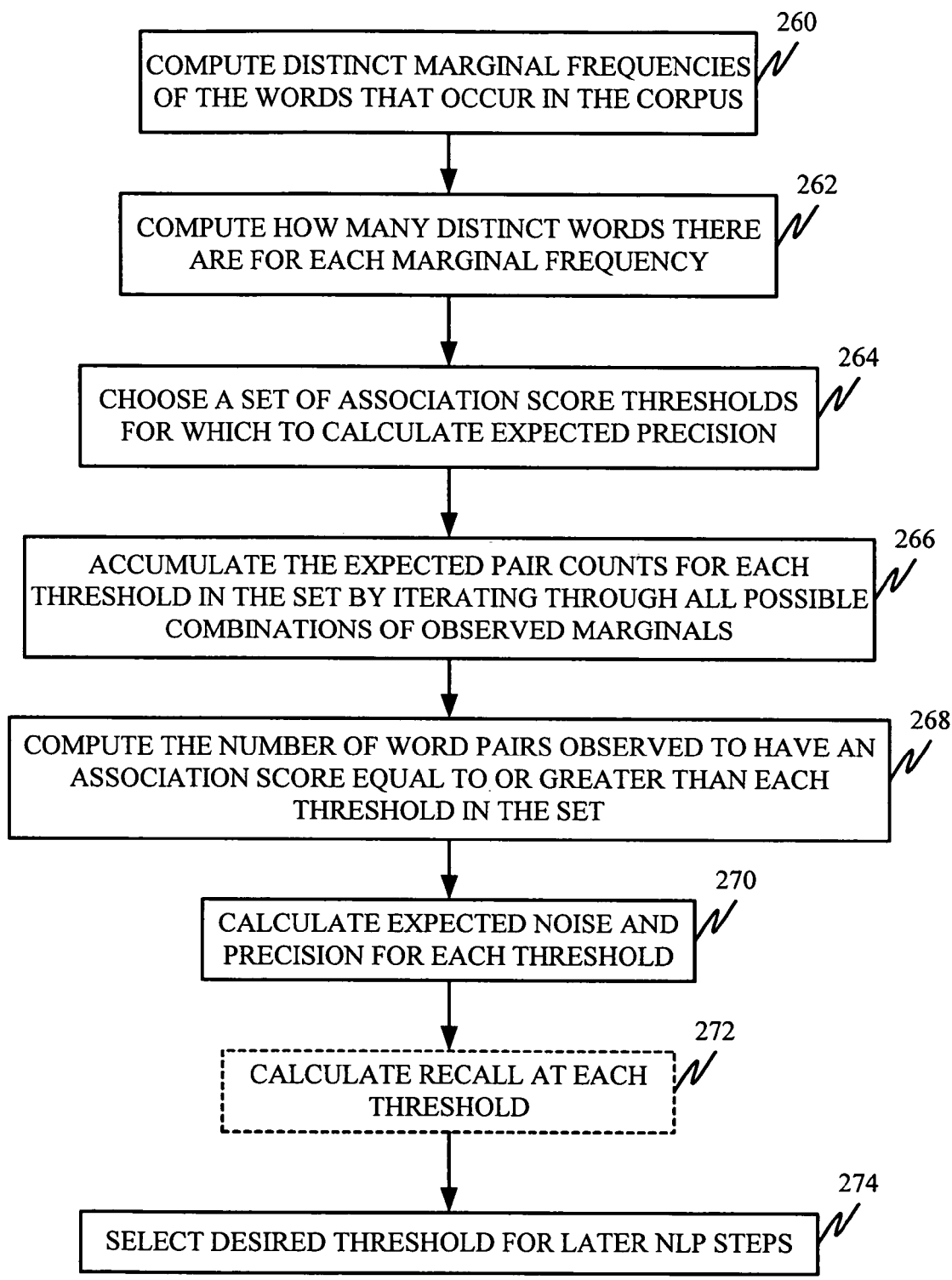
FIG. 4 is a flow diagram illustrating the overall operation of the rare event processing system shown in FIG. 3.

FIG. 3 illustrates a block diagram of a rare event processing system 250 for handling rare events in accordance with one embodiment of the present invention, and it illustratively forms part of machine translation learning component 202 shown in FIG. 2. FIG. 4 is a flow diagram illustrating the overall operation of system 250 shown in FIG. 3, in processing rare events to identify an association score threshold having a desired level of expected precision.

Rare event processing system 250 illustratively includes a rare event processing component 252 that has access to aligned text data corpus 204. Component 252 also illustratively receives an association score threshold range 254, discussed in greater detail below, and is coupled to count accumulators 256. Rare event processing component 252 illustratively outputs a selected word association threshold (or range of word association thresholds) 258 that have a desired expected precision. The word association threshold 258 will illustratively be used to identify the significance of word association scores used in machine translator 206 (shown in FIG. 2).

The operation of system 250 accommodates the complications discussed above with respect to computing the expected number of pairs with a given association score or higher for a large collection of words having a wide range of marginal frequencies. In operation, rare event processing component 252 first computes the distinct marginal frequencies of the words that occur in the aligned text corpus in data store 204. This is indicated by block 260 in FIG. 4. The marginal frequencies are illustratively computed separately for the two languages (such as English and French) in the corpus.

Component 252 then computes how many distinct words there are for each marginal frequency computed in block 260. This is indicated by block 262 in FIG. 4. In practice, it may be desirable for the processing steps indicated by blocks 260 and 262 to be performed simultaneously.

Rare event processing component 252 also receives the set of association score thresholds 254 for which it is to calculate expected precision. This is indicated by block 264. In one illustrative embodiment, the set of association score thresholds is set empirically by a user and is provided to processing component 252 through a conventional user input system. Of course, the set of association score thresholds can be chosen in a different way, as desired by the user. The set of association score thresholds will illustratively extend for a range through which a desired expected precision cutoff is expected to occur.

Next, component 252 accumulates the expected pair counts for each threshold in set 254 in accumulators 256. This is done by iterating through all possible combinations of observed marginal frequencies. This is indicated by block 266 in FIG. 4, and this is described in greater detail below with respect to FIG. 5 and the associated pseudocode in Table 1.

At this point, processing component 252 has computed the number of word pairs that would be expected by chance alone to have an association score equal to or greater than each of the thresholds in set 254. Therefore, component 252 next computes the number of word pairs observed in the corpus in data store 204 to have an association score equal to or greater than each of the thresholds in set 254. This is indicated by block 268 in FIG. 4.

Processing component 252 then computes the expected noise for each threshold in set 254 as the ratio of the expected number of word pairs for the threshold to the observed number of word pairs for the threshold. The expected precision for each threshold is simply one minus the expected noise for each threshold. This is indicated by block 270 in FIG. 4.

In one embodiment, processing component 252 can optionally calculate the recall at each threshold in set 254 as well. However, this need not be done, and is indicated by dashed block 272 in FIG. 4.

Component 252 then illustratively selects a desired association score threshold for later natural language processing steps. This is indicated by block 274 in FIG. 4. This step can be performed in one of a variety of different ways. For instance, the desired threshold can simply be selected by a user based on the expected precision calculated for each threshold. Alternatively, processing component 252 can automatically select the desired threshold based on criteria input by a user. Similarly, where recall is calculated as in block 272 in FIG. 4, component 252 can automatically select the desired threshold based on a tradeoff between precision and recall using any of a wide variety of known statistics, such as F-measure.

Figure 5:
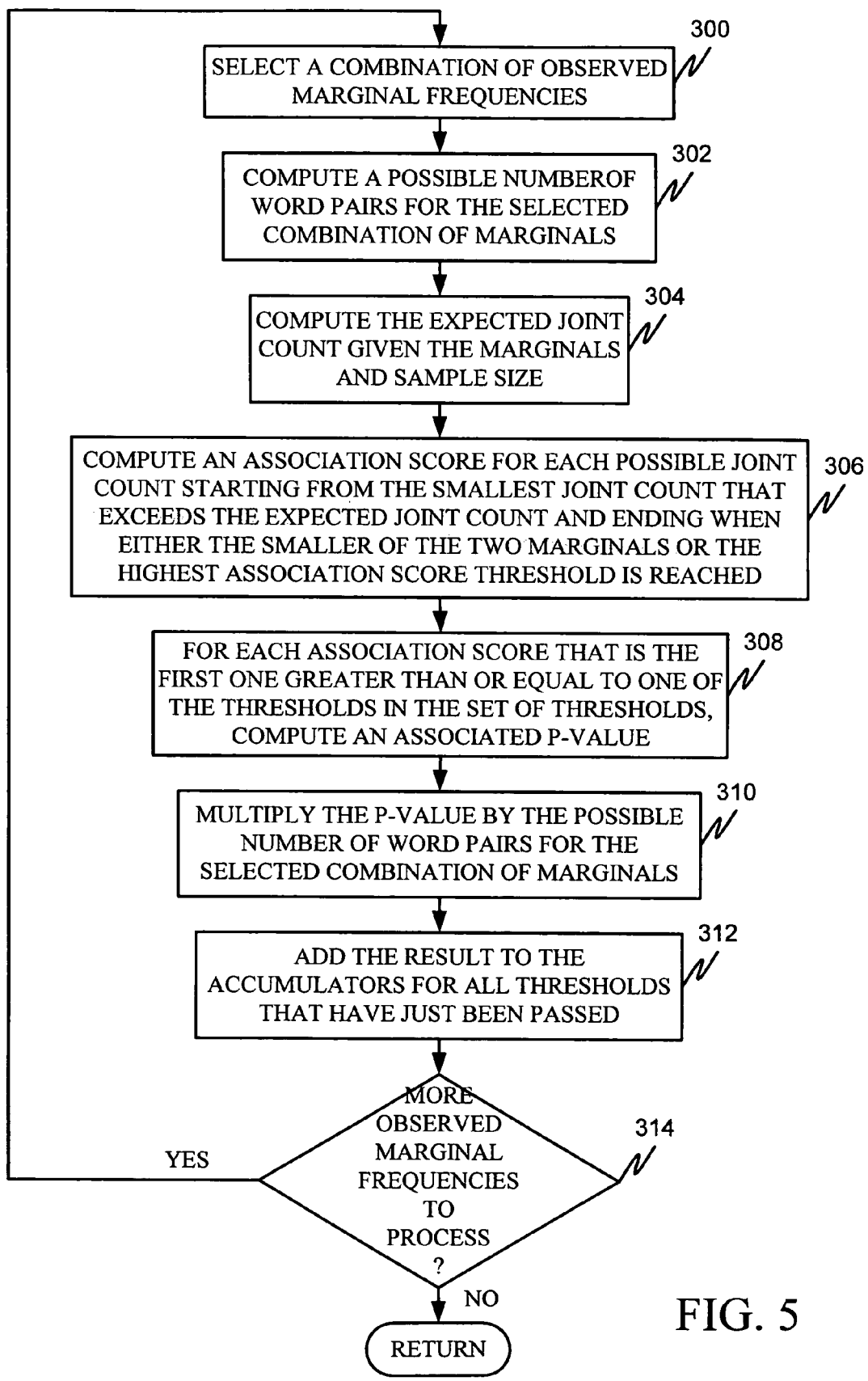
FIG. 5 is a more detailed flow diagram illustrating estimation of the expected number of pairs of items having a specified degree of association, conditioned on the marginal frequency of the items and the sample size.

FIG. 5 is a more detailed flow diagram illustrating the operation of component 252 in accumulating the expected counts for each threshold in set 254 by iterating through all possible combinations of observed marginals as discussed with respect to block 266 in FIG. 4. The pseudocode below also illustrates this operation:

TABLE 1 for each observed C(x) {
    for each observed C(y) {
        possible_pairs =
            | values of x with frequency C(x) |×
            | values of y with frequency C(y) |;

TABLE 1-continued

```
C₀(x,y) = int(C(x)C(y)/N)+1;
i = 1;
loop: for each C(x,y) such that
        C₀(x,y)   C(x,y)   min(C(x),C(y)) {
    score = assoc(C(x,y),C(x),C(y),N);
    if (score   threshold[i]) {
        prob = p-value(C(x,y),C(x),C(y),N);
        expected_pairs = prob × possible_pairs;
        while (score   threshold[i]) {
            expected_count[i] += expected_pairs;
            if (i < number of thresholds) {
                i++;
            }
            else{
                exit loop;
            }
        }
    }
}
```

In the pseudocode, the variable x ranges, illustratively, over all English words in an English-French bilingual corpus in data store 204;

y ranges, illustratively, over all the French words in the corpus in the data store;

C(x) and C(y) are observed marginal frequencies of words in the English-French corpus;

N is the sample size, illustratively the number of sentence pairs in the English-French corpus;

C(x,y) is a possible joint occurrence frequency of a word of English and a word of French occurring in the same sentence pair;

assoc(C(x,y),C(x),C(y),N) is an association score computed for words having the specified joint frequency, given the marginal frequencies and sample size; and p-value(C(x,y),C(x),C(y),N) is a p-value for the joint frequency given the marginal frequencies and sample size.

In estimating the expected number of pairs that occur by chance at each of the threshold degrees of association, and conditioned on the marginal frequencies and sample size, component 252 first selects a combination of observed marginal frequencies. This is indicated by block 300 in FIG. 5 and is shown in the first two lines of the pseudocode in Table 1. Component 252 then computes a possible number of word pairs for the selected combination of marginals. This is indicated by block 302 and is shown in lines 3-5 of the pseudocode. In computing the possible number of pairs, component 252 simply multiplies the number of English words in the corpus that have the marginal frequency C(x) by the number of French words in the corpus that have the marginal frequency C(y).

Component 252 then computes the smallest possible joint count C₀(x,y) greater than the expected joint count given the marginal frequencies and sample size. This is indicated by block 304. This value is computed as the integer portion of (C(x)C(y)/N)+1.

Then, for each possible joint count (starting from the smallest joint count that exceeds the expected joint count and ending when either the smaller of the two marginal frequencies C(x) and C(y) is reached, or the highest association score in the set of association score thresholds is reached) an association score is computed. This is indicated by block 306 in FIG. 5.

Whenever the first association score is encountered that is greater than or equal to one of the thresholds, an associated p-value is computed. This is indicated by block 308 in FIG. 5.

The p-value is then multiplied by the possible number of word pairs for the selected combination of marginals. This is indicated by block 310 in FIG. 5 and is shown by line 13 in the pseudocode. The result of this multiplication is added to the accumulators 256 for all thresholds that have just been passed. This is indicated by block 312 in FIG. 5 and is illustrated by line 15 of the pseudocode.

Component 252 thus calculates the p-values and increments the accumulators for each threshold value at the selected set of marginal frequencies. When this is completed, processing component 252 determines whether anymore observed marginal frequencies need to be processed. This is indicated by block 314 in FIG. 5. If so, component 252 selects a new combination of observed marginal frequencies and processing continues at block 300. If not, all combinations of observed marginal frequencies have been processed and the processing is completed. This is indicated by the closing of the internal loop and the "else" statement in the pseudocode.

Most measures of association have the property that they are symmetric with respect to the marginal frequencies C(x) and C(y). That is, assoc(C(x,y),C(x),C(y),N)=assoc(C(x,y),C(y),C(x),N). When this is the case, approximately half the time needed to compute the expected word pair counts for each threshold can be saved by considering a combination such as C(x)=n and C(y)=m at the same time as C(x)=m and C(y)=n, since all the corresponding association scores and p-values will be the same for these two cases.

A simple way of doing this is to restrict the algorithm as illustrated in Table 1 to cases where C(x) C(y), but to add to the count of possible word pairs corresponding to each such combination of marginal frequencies, the number of possible word pairs where the marginal frequencies are reversed, provided that the marginal frequencies are different. If the marginal frequencies are the same—i.e., if m=n—then the word pairs such that C(x)=n and C(y)=m are the same as the word pairs where C(x)=m and C(y)=n.

The system and method described above can be used to estimate the significance for virtually any measure of association, given a way to estimate the expected number of pairs of items having a specified degree of association or better, conditioned on the marginal frequencies of the items composing the pair and the sample size. For some plausible measures of association, the association metric itself can be used to estimate the p-values needed to compute the expected counts. $G^2$ is one such measure, but it may be less beneficial for computing p-values on the kind of data typical of natural language processing applications.

In one illustrative embodiment the present invention utilizes the hypergeometric probability distribution to compute what the exact probability of a particular joint frequency would be, if there were no association between the items in question, given the marginal frequencies and the sample size. The only assumption made is that all trials are independent. The formula for this probability in the present setting is as follows:

$$\frac{C(x)!C(\neg x)!C(y)!C(\neg y)!}{N!C(x,y)!C(\neg x, y)!C(x, \neg y)!C(\neg x, \neg y)!} \quad \text{Eq. 1}$$

Where C(x) is the marginal frequency of x;
C(y) is the marginal frequency of y;
C(¬x) represents the observed frequency where x does not occur;
C(¬y) is the observed frequency where y does not occur;
N is the sample size;

C(x,y) is the joint occurrence frequency of x and y;

C(¬x,y) is the observed frequency where x does not occur but y occurs;

C(x,¬y) is the observed frequency where y does not occur but x occurs; and

C(¬x,¬y) is the observed frequency where neither x nor y occur in the sentences of the corpus.

The p-value for a given joint frequency is obtained by summing the hypergeometric probability for that joint frequency and every more extreme joint frequency consistent with the marginal frequencies, where "more extreme" means farther from the expected joint frequency given the marginal frequencies and sample size. In the present discussion, more extreme joint frequencies are larger joint frequencies, since the present system is only interested in positive degrees of association. The null hypothesis that is to be disproved is that a pair of words is either negatively associated or not associated; hence, a one-sided test is appropriate. Computing p-values according to this technique is known as Fisher's Exact Test.

It can be seen from equation 1 that the hypergeometric probability distribution entails computing factorials of potentially large numbers and summing over many possible joint frequencies. Therefore, this test has traditionally been considered feasible only for relatively small sample sizes. However, a number of optimizations enable efficient estimation of p-values by Fisher's Exact Test for sample sizes up to at least $10^{11}$ on current ordinary desktop computers, where the limiting factor is the precision of 64-bit floating point arithmetic rather than computation time.

The present invention thus implements a number of these measures to make utilization of Fisher's Exact Test in the present context feasible. First, it is noted that the logarithms of factorials of large numbers can be efficiently computed by highly accurate numerical approximations of the logarithm of the gamma ($\Gamma$) function. This is set out in greater detail in Press et al., NUMERICAL RECIPES IN C: THE ART OF SCIENTIFIC COMPUTING, Second Edition, Cambridge University Press, Cambridge, England (1992). It is based on the identity $n!=\Gamma(n+1)$.

Similarly, the following is a well-known recurrence relation for the hypergeometric distribution:

$$P_k = \frac{C_{k-1}(\neg x, y) C_{k-1}(x, \neg y)}{C_k(x, y) C_k(\neg x, \neg y)} P_{k-1} \qquad \text{Eq. 2}$$

This recurrence relation readily accommodates calculation of probabilities for a sequence of consecutive joint frequencies, once the first one is obtained. The k in equation 2 indicates parameters associated with the kth joint frequency in the sequence.

Further, the highest possible joint frequency is, as shown in the pseudocode in Table 1 above, the smaller of the two marginal frequencies. Therefore, if one of the marginal frequencies is small, only a relatively few terms need to be summed.

Finally, the present invention illustratively iterates from less extreme joint frequencies to more extreme joint frequencies. Therefore, each probability in the summation will be smaller than the one before. If both the marginals are large, the summation will often converge to a constant value, given limited arithmetic precision, long before the smaller marginal is reached, at which point the summation can be terminated.

It should also be noted that when p-values are computed using Fisher's Exact Test, the algorithm for accumulating expected word pair counts, as described in FIG. 5 and Table 1, will result in recomputing the same hypergeometric probabilities multiple times. For example, the p-value for C(x,y)=4 will consist of a sum of hypergeometric probabilities, including all the probabilities that must be summed to compute p-values for C(x,y)=5, C(x,y)=6, etc.

Practitioners skilled in the art will recognize that there are many ways to modify our algorithm to avoid recomputation of hypergeometric probabilities. The simplest of these is caching. That is, for each combination of marginal frequencies, temporarily save the result of each computation of a hypergeometric probability. Each time a hypergeometric probability is required, check to see whether it has already been computed, and if so, use the saved value. When all the work associated with a particular combination of marginal frequencies is completed, the saved hypergeometric probabilities can be discarded, as they will not be needed again.

Another method of modifying the algorithm, which saves on additions of hypergeometric probabilities, as well as recomputation of these probabilities, is as follows: Note that each expected count we compute in block 310 is the number of word pairs, corresponding to a particular combination of marginals, expected to have an association score equal or greater than a given threshold. Suppose in the first instance, we instead compute the number of word pairs, corresponding to a particular combination of marginals, expected to have an association score equal to a given threshold or between that threshold and the next highest threshold. (For the very highest threshold, we do as previously). Computing these expected counts uses each hypergeometric probability only once. We can then compute the original expected counts by summing these modified expected counts starting from the highest threshold.

It should also be noted that it may be beneficial to modify Equations 1 and 2 to compute the logarithms of the hypergeometric probabilities to avoid numerical underflow when probabilities are very small. As noted above, logarithms of factorials are easily computed based on the logarithm of the gamma function, and the logarithms of hypergeometric probabilities can be computed from these according to Equations 1 and 2 by observing that $\log(XY)=\log(X)+\log(Y)$. The logarithm of p-values are then logarithms of sums of hypergeometric probabilities, which can be computed from those probabilities without risking numerical underflow by using Equation 3:

$$\log(X+Y)=\log(X)+\log(1+\exp(\log(Y)-\log(X))) \qquad \text{Eq. 3}$$

Where "exp" is the inverse function of "log"; that is, $\exp^A = B^A$ for whatever B is used for the base of "log".

In one illustrative embodiment, log(y) is no larger than log(x). If log(y) is greater than log(x), then the roles of x and y can simply be reversed. This eliminates the possibility of arithmetic overflow when computing exp(log(y)−log(x)), which could happen if log(y) where very much greater than log(x).

By taking advantage of the observations related to the efficient computation of Fisher's exact test, avoiding redundant computations, and computing p-values in terms of logarithms, it has been observed that the present invention can estimate the necessary expected joint frequencies for a 500,000 sentence pair corpus in 66.7 minutes using Fisher's Exact Test, compared to 57.4 minutes using an approximate estimate based on likelihood ratios, thus incurring a time penalty of only 16 percent for using the exact method.

Table 2 illustrates a table in which noise estimates were performed for 20 association score thresholds using both Fisher's Exact Test as means for estimating noise and a log-likelihood-ratio-based method as means of estimating noise.

The results are shown in Table 2 where the ratio of the two noise estimates is shown in the final column. The scores were computed on the textual corpus described throughout the present description.

TABLE 2

| Cut-Off | Fisher Noise Est | LLR Noise Est | Ratio LLR/Fisher |
|---|---|---|---|
| 1 | 0.624 | 0.792 | 1.27 |
| 2 | 0.516 | 0.653 | 1.27 |
| 3 | 0.423 | 0.384 | 0.91 |
| 4 | 0.337 | 0.274 | 0.81 |
| 5 | 0.256 | 0.183 | 0.71 |
| 6 | 0.181 | 0.114 | 0.63 |
| 7 | 0.119 | 0.0650 | 0.55 |
| 8 | 0.0713 | 0.0338 | 0.47 |
| 9 | 0.0394 | 0.0159 | 0.40 |
| 10 | 0.0205 | 0.00695 | 0.34 |
| 11 | 0.00946 | 0.00260 | 0.27 |
| 12 | 0.00432 | 0.000961 | 0.22 |
| 13 | 0.00136 | 0.000221 | 0.16 |
| 14 | 0.00137 | 0.000166 | 0.12 |
| 15 | 3.52e−005 | 2.00e−005 | 0.57 |
| 16 | 1.56e−005 | 8.02e−006 | 0.51 |
| 17 | 6.82e−006 | 3.19e−006 | 0.47 |
| 18 | 2.94e−006 | 1.24e−006 | 0.42 |
| 19 | 1.24e−006 | 4.65e−007 | 0.38 |
| 20 | 5.16e−007 | 1.72e−007 | 0.33 |

It can be seen from Table 2 that the noise estimates based on Fisher's Exact Test are below one percent above a log-likelihood ratio score of 11 and rise rapidly below that. This confirms anecdotal experience that a log-likelihood ratio score above 10 seems to be a reliable indicator of a significant association.

A comparison between the two noise estimates shows that the log-likelihood-ratio-based method underestimates the amount of noise except at very high noise levels. It is worst when the log-likelihood ratio score cutoff equals 14, which happens to be just below the log-likelihood ratio score 14.122 for singleton-singleton pairs. Since, for a given sample size, singleton-singleton pairs have the lowest possible expected joint count, this is probably the effect of known problems with estimating p-values from likelihood ratios when expected counts are very small.

While the present discussion has proceeded with respect to natural language processing and machine translation, the present invention can be used in a wide variety of other fields where the same sort of problem arises. For instance, field biology has the same kinds of Zipf's law problems as natural language processing. Only a few species are very common, most species are rare, and there is a long tail of increasingly rare species. In fact, Good-Turing smoothing was invented in order to estimate the frequency of rare species.

Suppose a field biologist is in an ecologically diverse region like a tropical rain forest, where there are many different species of insects and plants, most of them rare. The biologist wishes to study which insects feed on which plants, based on the hypothesis that if an insect is found on a certain plant significantly more often than chance, it probably feeds on that plant. Suppose also that there are a large number of insects and a large number of plants that have been seen only a few times, and sometimes the biologist has seen one of those insects on one of those plants. In order to decide whether those insects are feeding on those plants, the problem is exactly like that of deciding whether a rare word of English is significantly associated with a rare word of French, and the methods of this invention can be applied.

Another field involves data mining for business. Suppose a large regional bookstore has just put up an internet site to try to compete with a nationally known seller. Since the regional bookstore is known primarily in its region, at first most of its internet customers are from its region, with the number of customers becoming smaller the farther away from its brick-and-mortar stores they are. Assume the bookstore sells a lot of copies of a small number of best-sellers, and few copies of most of other books. The bookstore wishes to increase its national market by a direct mail campaign where it offers deep discounts on particular books that sell better in different regions. The bookstore has few customers in most regions so it's hard to know when its data suggests a particular item is more popular than average in a given region. For example, assume the bookstore had only three customers from Midland, Tex., but two of them have bought "George Washington: Our Greatest President." Should the bookstore promote that book heavily in West Texas? If the store has enough data for different regions and different books, it can easily answer such questions using the present invention.

The present invention can also be used to analyze the precision of words of the same language. For instance, suppose we notice that the word "Patent" is sometimes immediately followed by the word "Office", and we want to know whether this is significant. We can look at the marginal frequencies of "Patent" and "Office" and the joint frequency of "Patent Office" and apply the techniques of the invention to estimate the expected noise and precision of pairs of consecutive words with the degree of association exhibited by "Patent Office". In this case the two sets of words are virtually the same. The first set is the set of words comprising the first word of a pair of consecutive words, and the second set is the set of words comprising the second word of a pair of consecutive words. The first set might consist of all the words in a text except the last word, and the second set might consist of all the words in the text except the first word.

It can thus be seen that the present invention can be used to compute precision of associations between types of items in one class with types of items in another class. Of course, the items can be words and the classes can be languages. However, as discussed above, the items and classes can be varied as the application requires.

One embodiment of the invention includes a generalized two-stage procedure for identifying an association threshold to be used in a natural language processing system (such as to train a machine translation). One embodiment of the present invention also provides a specific algorithm for obtaining estimates of expected counts assuming non-association between items.

Further, one embodiment of the present invention provides a method of efficiently implementing Fisher's Exact Test such that it is feasible in generating the expected counts. Using Fisher's Exact Test to estimate p-values allows the present invention to estimate noise for collections of rare events that provide precision results that are quite consistent with previous anecdotal experience in using log-likelihood ratio scores as a measure of word association. Using log-likelihood ratios to estimate the p-values introduces a substantial amount of error, but not the orders of magnitude previously taught by the prior art.

The present invention also shows that Fisher's Exact Test can be applied without a substantial computational penalty.

Although the present invention has been described with reference to particular embodiments, workers skilled in the art will recognize that changes may be made in form and detail without departing from the spirit and scope of the invention.

What is claimed is:

1. A computer-implemented method for identifying a precision of a given association score, indicative of an estimated association between items from a first class of items and items from a second class of items, the method comprising:
    obtaining, as an input, an association score;
    accumulating an expected pair count corresponding to the association score, the expected pair count being indicative of an expected number of item pairs having an association score at least as great as the given association score, the item pairs including an item from the first class and an item from the second class;
    computing an observed pair count corresponding to the given association score, the observed pair count being indicative of a number of item pairs having an association score at least as great as the association score;
    identifying the precision of the given association score based on the expected pair count and the observed pair count; and
    providing an output based on the precision to configure a component of a machine translator.

2. The method of claim 1 and further comprising:
    receiving a set of association score thresholds; and
    wherein the steps of accumulating, computing and identifying are performed for each association score threshold in the set of association score thresholds.

3. The method of claim 2 and further comprising:
    identifying one of the association score thresholds based on the precision identified for each association score threshold.

4. The method of claim 3 wherein identifying one of the association score thresholds comprises:
    computing expected noise corresponding to each association score threshold in the set of association score thresholds; and
    identifying the association score threshold based on the expected noise.

5. The method of claim 3 wherein identifying the association score threshold comprises:
    computing the expected precision corresponding to each association score threshold in the set of association score thresholds; and
    identifying the association score threshold based on the expected precision.

6. The method of claim 3 and further comprising:
    training a machine translator based on the identified association score threshold.

7. The method of claim 1 wherein the items comprise words.

8. The method of claim 7 and further comprising: computing marginal frequencies of the words.

9. The method of claim 7 and further comprising:
    computing word counts corresponding to each marginal frequency, the word counts corresponding to a given marginal frequency representing a number of words in the first class of words having the given marginal frequency and a number of words in the second class of words having the given marginal frequency.

10. The method of claim 7 wherein the first class of words comprises a first set of textual fragments and wherein the second class of words comprises a second set of textual fragments aligned with the first set of textual fragments.

11. The method of claim 10 wherein the first set of textual fragments comprises a set of sentences in a first language and the second set of textual fragments comprises a set of sentences in a second language.

12. The method of claim 1 wherein accumulating expected pair counts includes:
    accumulating the expected pair counts by iterating through all possible combinations of observed marginal frequencies for the items in the first class of items and observed marginal frequencies for items in the second class of items.

13. The method of claim 12 wherein accumulating comprises:
    selecting a combination of observed marginal frequencies.

14. The method of claim 13 wherein accumulating expected pair counts comprises:
    computing a possible number of item pairs for the selected combination of observed marginal frequencies.

15. The method of claim 14 wherein accumulating expected pair counts comprises:
    computing an expected joint count given the selected combination of observed marginal frequencies and given a sample size.

16. The method of claim 15 wherein accumulating expected pair counts comprises:
    computing an association score for the selected combination of observed marginal frequencies, for each possible joint count starting from a smallest joint count that exceeds the expected pair count and ending either when reaching a smallest marginal frequency in the selected combination of observed marginal frequencies or when the computed association score reaches a highest association score in a set of association score thresholds.

17. The method of claim 16 wherein accumulating expected pair counts comprises:
    computing a p-value corresponding to each computed association score that is the smallest score at least as great as one of the association score thresholds in the set of association score thresholds, the p-value being indicative of a probability of observing by chance a given joint count or a joint count greater than the given joint count.

18. The method of claim 17 wherein accumulating expected pair counts comprises:
    computing an incremental expected pair count corresponding to each of the association score thresholds based on the associated p-value and the possible number of word pairs for the selected combination of observed marginal frequencies.

19. The method of claim 18 wherein accumulating expected pair counts comprises:
    accumulating the incremental expected pair counts for each corresponding association score threshold.

20. The method of claim 19 wherein iterating through all possible combinations of observed marginal frequencies comprises:
    repeating the steps in claims 13-19 for each possible combination of observed marginal frequencies.

21. The method of claim 17 wherein computing a p-value comprises:
    computing a value of a hypergeometric probability distribution for each of a sequence of joint counts from the given joint count and for larger joint counts for which an association score is computed; and
    summing the computed values of the hypergeometric probability distribution.

22. The method of claim 21 wherein computing a value of the hypergeometric probability distribution comprises:
    applying a numerical approximation of a gamma function to approximate factorials in the definition of the hypergeometric probability distribution.

23. The method of claim 22 wherein computing a value of the hypergeometric probability distribution comprises:
applying a recurrence relation to obtain subsequent values of the hypergeometric probability distribution for the sequence of joint counts, once an initial value of the hypergeometric probability distribution is calculated for the sequence of joint counts.

24. The method of claim 23 wherein summing the values of the hypergeometric probability distribution comprises:
summing the values of the hypergeometric probability distribution from a smallest joint count in the sequence of joint counts to a largest joint count in the sequence of joint counts, stopping when the sum converges to a desired degree of convergence.

25. The method of claim 24 wherein the desired degree of convergence is reached when the sum converges to a constant value given an arithmetic precision of a computer on which the computer-implemented method is implemented.

26. A computer-implemented method for accumulating an expected pair count corresponding to each of a set of association score thresholds, the association score thresholds estimating association between items in a data sample, each expected pair count being indicative of an expected number of items pairs having an association score at least as great as the corresponding association score threshold, the item pairs including an item from a first set of items in the data sample and an item from a second set of items in the data sample, the method comprising:
obtaining, as an input, a selected combination of observed marginal frequencies;
computing a possible number of item pairs for the selected combination of observed marginal frequencies;
computing an expected joint count given the selected combination of observed marginal frequencies and given a sample size in the data sample;
computing an association score for the selected combination of observed marginal frequencies, for each possible joint count starting from a smallest joint count that exceeds the expected pair count and ending either when reaching a smallest marginal frequency in the selected combination of observed marginal frequencies or when the computed association score reaches a highest association score in the set of association score thresholds;
computing a p-value corresponding to each computed association score that is the smallest score at least as great as one of the association score thresholds in the set of association score thresholds, the p-value being indicative of a probability of observing by chance a given joint count or a joint count greater than the given joint count;
computing an incremental expected pair count corresponding to each of the association score thresholds based on the associated p-value and the possible number of item pairs for the selected combination of observed marginal frequencies;
accumulating the incremental expected pair counts for each corresponding association score threshold; and
providing an output based on the accumulated expected pair counts to configure a component of a machine translator.

27. The method of claim 26 and further comprising:
selecting the selected combination of observed marginal frequencies.

28. The method of claim 27 and further comprising:
repeating the steps in claims 25-26 for each combination of observed marginal frequencies in a set of combinations of observed marginal frequencies.

29. The method of claim 26 wherein computing a p-value comprises:
computing a value of a hypergeometric probability distribution for each of a sequence of joint counts from the given joint count and for larger joint counts for which an association score is computed; and
summing the computed values of the hypergeometric probability distribution.

30. The method of claim 26 wherein computing a value of the hypergeometric probability distribution comprises:
applying a numerical approximation of a gamma function to approximate factorials in the definition of the hypergeometric probability distribution.

31. The method of claim 30 wherein computing a value of the hypergeometric probability distribution comprises:
applying a recurrence relation to obtain subsequent values of the hypergeometric probability distribution for the sequence of joint counts, once an initial value of the hypergeometric probability distribution is calculated for the sequence of joint counts.

32. The method of claim 31 wherein summing the values of the hypergeometric probability distribution comprises:
summing the values of the hypergeometric probability distribution from a smallest joint count in the sequence of joint counts to a largest joint count in the sequence of joint counts, stopping when the sum converges to a desired degree of convergence.

33. The method of claim 32 wherein the sum converges to a desired degree of convergence when the sum converges to a constant value given an arithmetic precision of a computer on which the computer-implemented method is implemented.

34. A computer implemented method for identifying an association score threshold, indicative of an association score representing an estimated association between words from a first set of words in a textual corpus and words from a second set of words in the textual corpus, the method comprising:
receiving a set of association score thresholds;
accumulating an expected pair count corresponding to each association score threshold, each expected pair count being indicative of an expected number of word pairs having an association score at least as great as the corresponding association score threshold, the word pairs including a word from the first set and a word from the second set;
computing an observed pair count corresponding to each association score threshold in the set of association score thresholds, each observed pair count being indicative of a number of word pairs having an association score at least as great as the corresponding association score threshold;
identifying the association score threshold based on the expected pair counts and the observed pair counts; and
providing an output based on the identified association score threshold to configure a component of a machine translation system.

35. The computer implemented method of claim 34 wherein identifying the association score comprises:
computing expected noise corresponding to each association score threshold in the set of association score thresholds; and
identifying the association score threshold based on the expected noise.

36. The computer implemented method of claim 34 wherein identifying the association score comprises:
computing the expected precision corresponding to each association score threshold in the set of association score thresholds; and identifying the association score threshold based on the expected precision.

37. The computer implemented method of claim 34 and further comprising:

computing marginal frequencies of the words in the corpus.

38. The computer implemented method of claim 34 and further comprising:

computing word counts corresponding to each marginal frequency, the word counts corresponding to a given marginal frequency representing a number of words in the first set of words in the corpus that has the given marginal frequency and a number of words in the second set of words in the corpus having the given marginal frequency.

39. The computer implemented method of claim 34 wherein the first set of words comprises a first set of textual fragments and wherein the second set of words comprises a second set of textual fragments aligned with the first set of textual fragments.

40. The computer implemented method of claim 39 wherein the first set of textual fragments comprises a set of sentences in a first language and the second set of textual fragments comprises a set of sentences in a second language.

* * * * *